Feb. 20, 1951 K. K. PROBST 2,542,261
VEHICLE SUSPENSION
Filed May 11, 1946 6 Sheets-Sheet 3

INVENTOR.
Karl K. Probst.
BY
Harness, Dickey & Pierce.
ATTORNEYS.

Patented Feb. 20, 1951

2,542,261

UNITED STATES PATENT OFFICE 2,542,261

VEHICLE SUSPENSION

Karl K. Probst, Lansing, Mich.

Application May 11, 1946, Serial No. 669,121

13 Claims. (Cl. 267—58)

This invention relates to new and useful improvements in vehicle suspension systems.

An important object of the invention is to provide a vehicle suspension system that combines all wheel mounting and shock absorbing apparatus in a master assembly.

Another object of the invention is to provide apparatus of the above-mentioned character that affords a separate suspension for each road wheel and in which each wheel and parts associated therewith can easily be removed as a unit from the vehicle body.

Yet another object of the invention is to provide a vehicle suspension system of the above-mentioned character that includes relatively simple mechanism for maintaining the caster and camber angles of the kingpins and for sustaining inertia of the load due to acceleration of the vehicle.

Still another object of the invention is to provide a vehicle suspension system of the above-mentioned character that is light in weight and relatively inexpensive to manufacture.

A further object of the invention is to provide a vehicle suspension system in which the shock-absorbing apparatus affords maximum comfort and efficiency under all load conditions.

Other objects and advantages of the invention will be apparent during the course of the following description.

In the drawings forming a part of this specification and wherein like numerals are employed to designate like parts throughout the same.

According to the present invention each road wheel is equipped with its own spring suspension and shock-absorber system and operates substantially independently of the other wheels in supporting the vehicle load and absorbing road shocks. However, in order to obtain a strong, rigid construction that is mechanically simple and light in weight, both front-wheel suspension systems are connected by a single cross tube or axle adjacent the forward end of the vehicle frame, and the two rear-wheel suspension systems are connected by a second cross tube adjacent the rearward end of the frame. All of the suspension systems are similar in construction and operation in so far as their load-supporting and shock-absorbing functions are concerned, but the rear suspension systems are provided with special wheel mountings in order to accommodate the rear-wheel drive mechanisms.

Figure 1:
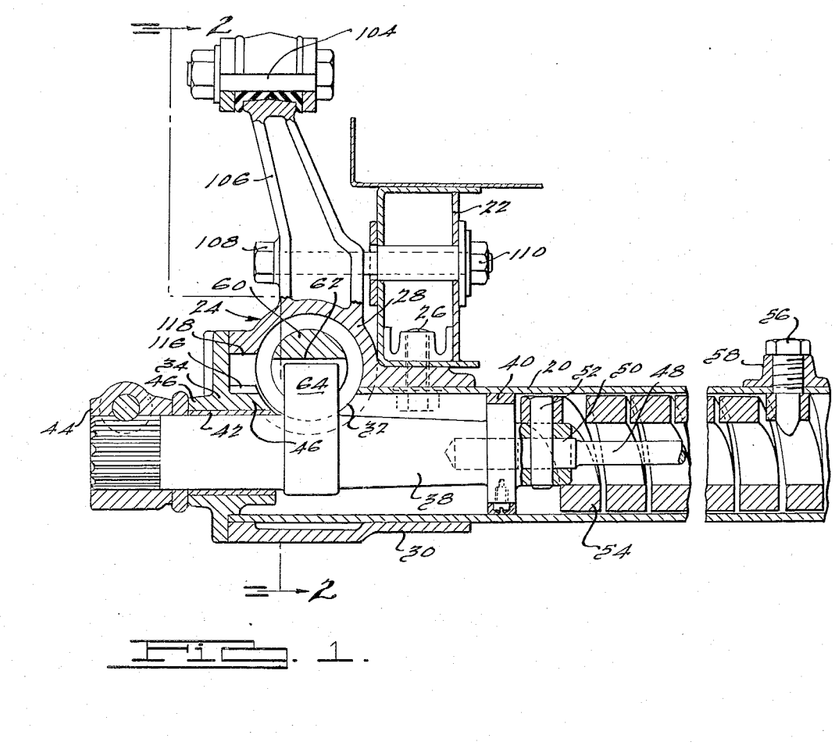
Fig. 1 is a longitudinal sectional view through the cross tube or axle comprising a part of the vehicle suspension system and showing the manner in which the latter is adapted for the front wheels of the vehicle.

The cross tube which connects the two front-wheel suspension systems at opposite sides of the vehicle frame is designated by the numeral 20, and, as shown in Fig. 1, this tube extends transversely across the vehicle body under the main frame side rails 22. As suggested, one suspension system is merely the opposite hand of the other; therefore, a detailed description of but one is given. Each end of the cross tube 20 is rigidly held by a casting 24 which, in turn, is fastened solidly to the adjacent main frame side rail 22 by cap screws 26.

More specifically, casting 24 is formed with integral, right angularly disposed, upper and lower tubular portions 28 and 30 respectively. The upper tubular portion 28 defines a cylinder arranged at the outer side and parallel to the side rail 22, and the lower portion 30 projects transversely under the side rail to receive and solidly support the cross tube 20. Cylinder 28 is partially embedded in the lower portion 30 so that the cylinder bore intersects the latter, and cross tube 20 is provided with a transverse opening 32 which coincides with the intersecting portion of the bore and establishes communication between the cylinder and cross tube. An end plate 34 attached to casting 24 by cap screws 36 closes the open end of cross tube 20.

A crankshaft 38 is journaled in cross tube 20 for rocking movement about its axis. Adjacent its inner end the crankshaft 38 carries an external bearing 40 which snugly fits and is rotatably supported by the cross tube 20. The outer terminal portion of the crankshaft is supported by a horizontal bushing 42 carried by end plate 34, and splined on the projecting end thereof is a crank arm 44 which carries the wheel mounting. Preferably the bushing 42 is relatively long to provide ample bearing surface for the crankshaft and is supported by integral tubular extensions 46 on the end plate 34. By removing cap screws 36, the end plate 34 and crankshaft 38, together with parts attached to the latter, can be removed as a unit from the cross tube 20.

Extending axially through the cross tube 20 between the two crankshafts 38 is a flexible metal rod 48, and at each end of the latter is a yoke 50 which enters a socket in its respective crankshaft and embraces a cross pin 52 carried thereby. This rod 48 yieldingly co-ordinates the two wheels supported by the cross tube 20, viz., tends to swing both wheels in the same direction when one wheel strikes a bump or other obstruction in the road bed and thus keeps the vehicle body more or less level. Manifestly, the yokes 50 automatically disengage the pins 52 when the crankshafts 38 and their adjuncts are dismounted in the manner hereinabove described.

From the foregoing it will be readily apparent that the basic structure described provides means for mounting either the two front or the two rear wheels of the vehicle and that the wheels are supported by the crankshafts 38 and cross tube 20 through crank arms 44. However, since the wheel spindles are offset laterally with respect to the crankshafts 38 and the latter are journaled in the cross tube 20, it obviously is necessary to provide means for controlling the rotative movement of the crankshafts.

According to the present invention, rotative movement of each crankshaft 38 is controlled by a plurality of uniquely positioned and mutually coactive springs or rubber members. These springs provide a variable rate suspension system for the vehicle body and permit the crankshafts 38 to rock about their axes in accordance with the load of the vehicle and road shocks to which they are subjected in use. It is an important aspect of the present invention that the same basic structure is used to actuate the spring suspension or shock absorber system as is used to mount the road wheels. As a result of this combination and correlation of parts, a lightweight, compact assembly is obtained, and minimum manufacturing costs are maintained without sacrificing either strength or efficiency of operation.

Considered in certain of its broader aspects the spring suspension, shock-absorber system comprises a main torsion spring for each crankshaft 38, which springs collectively afford the principal support for the vehicle load. In practice, it is contemplated that the torsion springs constitute the sole support for approximately the first twenty-five per cent of normal load and that they then be supplemented by compression springs in the cylinders 28. The compression springs are tensioned by pistons which are moved back and forth in the cylinders by levers on the crankshafts 38, and the parts are so correlated that the pistons do not load the compression springs until the vehicle carries approximately twenty-five per cent of its normal load.

The compression and torsion springs operate jointly to afford the principal support for any load between twenty-five per cent of normal load and twenty-five percent overload. If the vehicle loads exceeds the latter amount, a rubber bumper, which preferably is carried by the crank arm 44, is engaged to provide an additional spring or shock absorber element. Since the bumper is a solid resilient member, its resistance to deformation increases progressively as the load increases, and it consequently affords a variable-rate shock-absorber element capable of sustaining excessive vehicle loads and road shocks.

For a more detailed description of the spring suspension and shock-absorber system, reference is again had to the drawings wherein the main torsion spring is designated by the numeral 54. As shown in Fig. 1, spring 54 is disposed in cross tube 20 inwardly of the crankshaft 38. At its outer end the torsion spring 54 is attached to crankshaft 38 by an extension of cross pin 52, and at its inner end the torsion spring is anchored to the cross tube 20 by a locking screw 56 which is carried by an external mounting 58 on the cross tube. Since the head of screw 56 is disposed exteriorly of the cross tube 20, it is readily accessible for manual operation and release or attachment of spring 54.

Figures 2, 3:
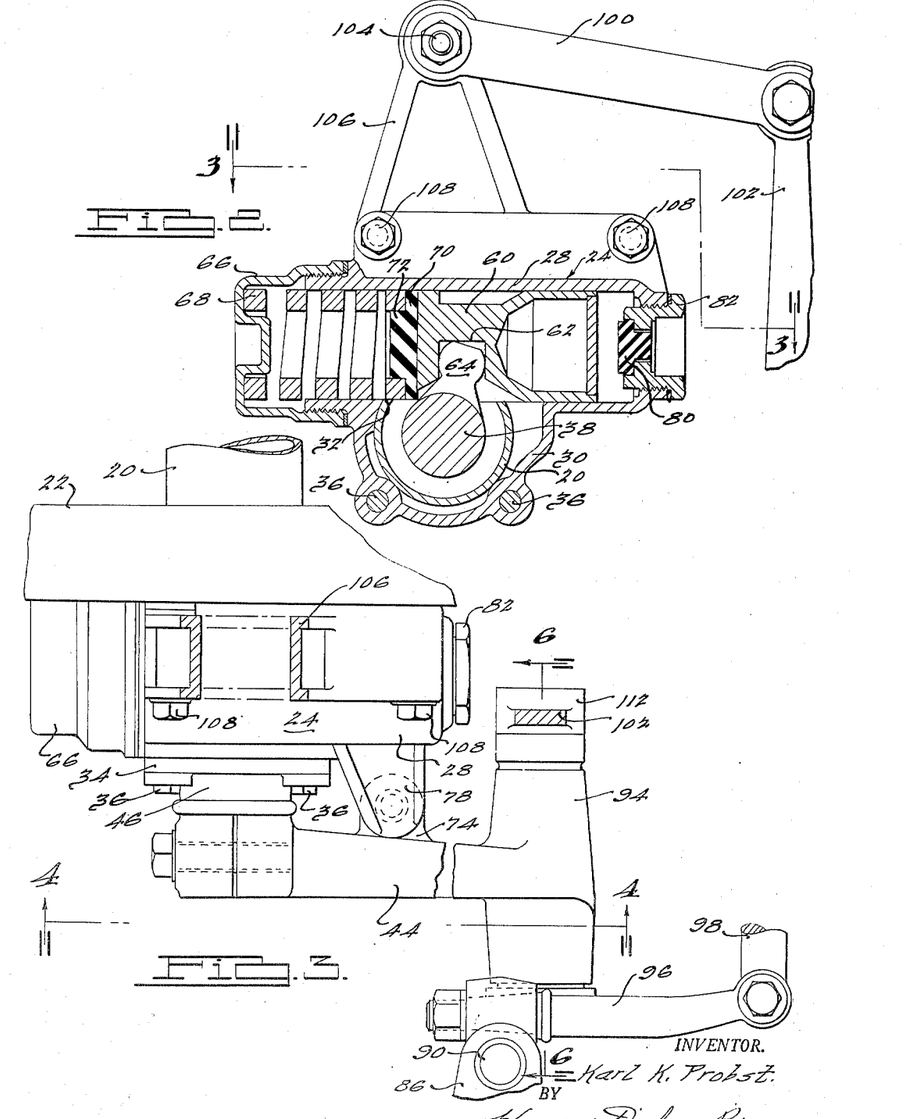
Fig. 2 is a transverse, vertical sectional view taken on the line 2—2 of Fig. 1.
Fig. 3 is a transverse, horizontal sectional view taken on the line 3—3 of Fig. 2.

Mounted for reciprocation in the cylinder 28 is a piston 60. In its underside the piston 60 is provided with a transverse groove 62 which accommodates and confines the terminal portion of a lever 64 carried by and extending radially from the crankshaft 38 through opening 32. As shown in Fig. 2, the forward end of cylinder 28 is closed by a threaded cap 66 which is readily demountable to permit insertion or removal of piston 60. Disposed ahead of the piston 60 and seating against the cap 66 is a compression spring 68. Overlying the inner end of spring 68 is a rubber pad 70 which provides a resilient and shock-absorbing seat for the piston 60. Formed centrally on the pad 70 is a projecting boss 72 which fits snugly in the endmost coil of the spring and holds the disk normally associated therewith.

As suggested, the main torsion springs 54 alone sustain a predetermined minimum load, which preferably is any load less than about twenty-five per cent of the normal vehicle load. In the case of a conventional private passenger car, the normal load is about five or six persons. Crankshafts 38 rock back and forth about their axes in accordance with variations in the vehicle load and the severity of road shocks, and, as the crankshafts move, they swing levers 64 which move pistons 60 back and forth in the cylinders 28. When the vehicle load increases, levers 64 swing to the left, as viewed in Fig. 2, and move pistons 60 toward the compression springs 68; and, as the load decreases, the levers swing to the right, as viewed in Fig. 2, and move the pistons away from the compression springs. When the vehicle load exceeds the predetermined minimum amount above referred to, pistons 60 engage the pads 70 and begin to compress or load springs 68. Thereafter, and until a second predetermined vehicle load (preferably about twenty-five per cent above normal load) is reached, the torsion springs 54 and compression springs 68 act jointly to afford the sole support for the load.

In order to relieve springs 54 and 68 when the vehicle is overloaded, i. e., when a load in excess of the second predetermined load conditions above referred to is imposed on the vehicle, a third spring element is engaged. As best shown, in Figs. 4 and 5, each crank arm 44 carries a laterally extending ear 74 which supports a rubber bumper or shock-absorber element 76. This bumper is positioned directly under a stop 78 which is formed integrally on and projects horizontally from the casting 24. An excessive vehicle load or road shock brings the rubber bumper 76 against stop 78. Thereafter, the bumper 76 supplements the action of springs 54 and 68, and it will be observed that bumper 76 is generally pyramidical in shape so that its resistance to deformation increases progressively as the load increases. Thus, after its engagement with stop 78 the bumper 76 assumes the vehicle load and prevents springs 54 and 68 from being stressed beyond their elastic limits.

The above description primarily is concerned with the action of the spring suspension systems under static load conditions, but it will be readily apparent that they operate in the same manner to alleviate road shock transmitted through the ground-engaging wheels. For example, as the wheels traverse an uneven surface, crank arms 44 rock in a vertical plane and act through the crankshafts 38 and levers 64 to move pistons 60 back and forth in cylinders 28. Regardless of the static load carried by the vehicle, the three spring suspension elements 54, 68, and 76 sustain road shock and act separately or jointly, depending upon the severity of the shock. Manifestly, movement of the crankshafts 38 is resisted, under all load or shock conditions, by torsion springs 54; and, if the road shock is sufficiently great, springs 68 are compressed and bumpers 76 are deformed against their respective stops 78, even though a minimum static load is carried by the vehicle.

Figures 4, 5, 6:
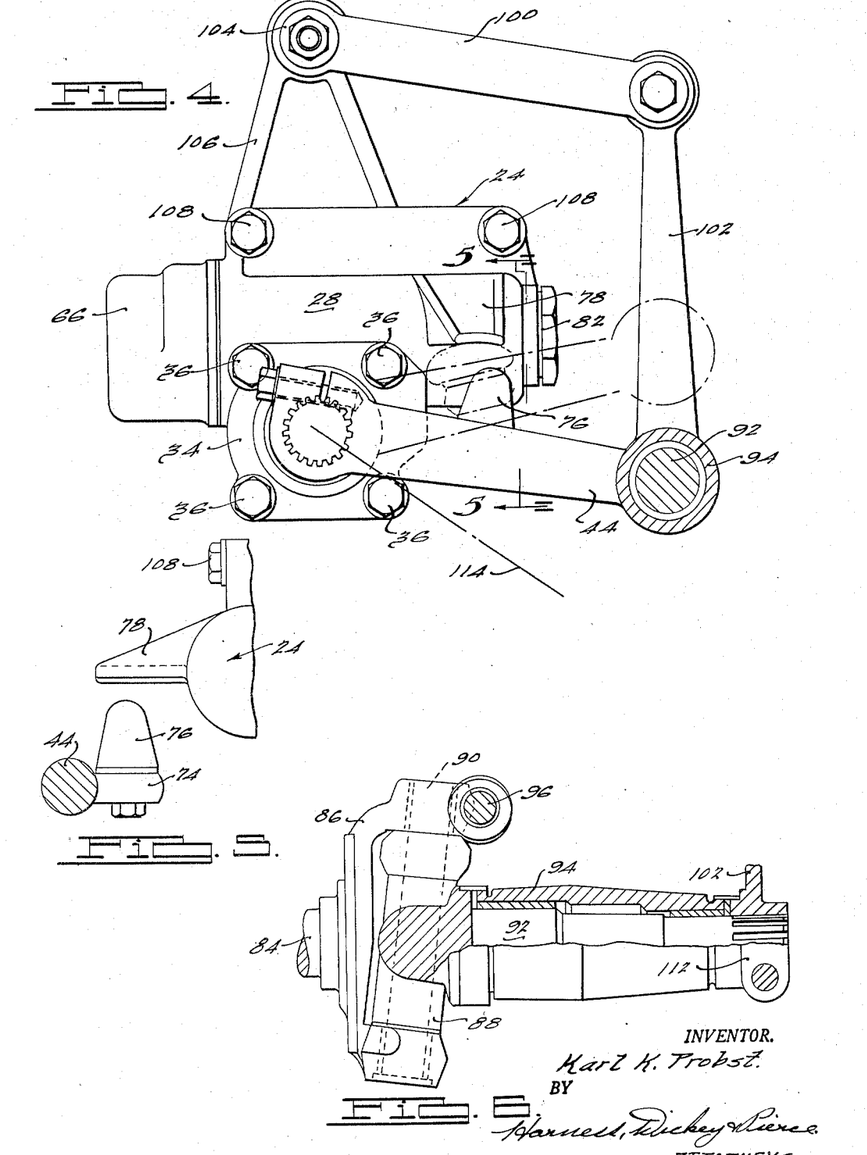
Fig. 4 is a transverse, vertical sectional view taken on the line 4—4 of Fig. 3.
Fig. 5 is a fragmentary, transverse, vertical sectional view taken on the line 5—5 of Fig. 4.
Fig. 6 is a longitudinal sectional view taken on the line 6—6 of Fig. 3.

Thus, when the vehicle is under minimum static load and a wheel strikes a bump or acclivity in the road surface, the crank arm 44 on which it is mounted rocks upwardly from the normal position shown by full lines in Fig. 4 and tightens the torsion spring 54. As crank arm 44 swings upwardly, crankshaft 38 rotates in a clockwise direction, as viewed in Fig. 2, and lever 64 moves piston 60 to the left. This action compresses spring 68 which then supplements the torsion spring 54. If the shock is sufficiently great, crank arm 44 swings upwardly a sufficient distance to bring bumper 76 against stop 78. Thus, the shock is first taken by torsion spring 54, then by the torsion spring and compression spring 68 jointly, and finally by the two springs 54 and 68 and bumper 76. The maximum upward position of the crank arm 44 is shown by dot-and-dash lines and in this position all the spring elements are under substantially maximum load.

When a wheel passes over a bump or other obstruction, the spring suspension elements are suddenly relieved of the load or shock, and this causes the crank arm 44 to drop. The portion of cylinder 28 behind piston 60 constitutes a conventional hydraulic shock absorber. Thus, return movement of piston 60 is damped by the hydraulic liquid in the cylinder 28. This hydraulic shock absorber system is not shown in detail, since its construction and mode of operation are conventional and well known to those skilled in the art. In order to prevent the returning piston 60 from striking the end of cylinder 28, a rubber bumper 80 is mounted in a suitable plug 82 which is threaded in the end of the cylinder.

Attention is now directed specifically to Figs. 1–6 which show the wheel suspension adapted for the front wheels of the vehicle. The front-wheel mounting here shown by way of illustration comprises a spindle 84 on which the road wheel (not shown) is mounted, and at the inner end of the spindle is a yoke 86 which is pivoted to a supporting eye 88 by a kingpin 90. Supporting eye 88 carries a stub shaft 92 which is journaled in a horizontal bearing 94 formed integrally at the distal end of the wheel-supporting crank arm 44. The yoke 86 is provided with the usual steering arm 96, and the latter is pivoted to a tie rod 98 in the conventional manner.

As the crank arms 44 rock about crankshafts 38 in operation the kingpins 90 are maintained at a constant angle to the ground by a pair of articulated links 100 and 102. Link 100 is pivoted at 104 to a vertical bracket or support 106 which is formed integrally on the cylinder 28 and attached to the main frame side rail 22 by bolts 108 and nuts 110. Link 102 is formed integrally on a collar 112 which is keyed on the projecting end of stub shaft 92 and disposed against the rearward end of bearing 94. Link 100 preferably is substantially parallel to crank arm 44, and link 102 preferably is substantially vertical, as shown in Fig. 4. In effect, the crank arm 44 and links 100 and 102 form a parallelogram arrangement which permits the crank arm to swing freely about crankshaft 38 within limits imposed by lever 64 and opening 32, but, at the same time, prevents the caster or camber angle of kingpins 90 from changing.

As suggested, it is a further feature of this invention that crankshaft 38 and its appurtenances, including torsion spring 54, can be dismounted from the cross tube 20 and casting 24 to permit easy repair or replacement of parts. To disassemble the crankshaft unit, the vehicle is raised by a hydraulic jack or other suitable means, articulated links 100 and 102 are disconnected and plug 82 is unscrewed, so that piston 60 can be moved to the rearward end of cylinder 28. In this position of the piston 60, crank arm 44 swings downwardly to a preload position indicated by the line 114 (Fig. 4) to relieve torsion spring 54 of all tension. When spring 54 is thus relieved, locking screw 56 can be removed and the lever 64 moved into alignment with registering passages 116 and 118 which extend from opening 32 laterally or outwardly through the end of cross tube 20 and the side of cylinder 28 respectively. When cap screws 36 are removed to release end plate 34, the crankshaft 38 and torsion spring 54 can be pulled axially from the cross tube 20. During such movement of the crankshaft, lever 64 traverses passages 116 and 118. In this connection it will be observed that the rebound bumper 80 is normally positioned to prevent groove 62 from moving into register with passages 116 and 118, but is adjustable through plug 82 to permit such registration. Also, passages 116 and 118 are normally closed by end plate 34, but are opened when the latter is removed so that lever 64 can be removed with crankshaft 38.

Manifestly, the crankshaft unit can be mounted in the cross tube 20 and casting 24 by reversing the procedure described above. Piston 60 is positioned to effect registration of groove 62 with passages 116 and 118 and so that lever 64 will slide into the groove when crankshaft 38 and torsion spring 54 are pushed into the cross tube with crank arm 44 in the preload position 114. When the unit is pushed entirely into the cross tube, the opening at the inner end of torsion spring 54 is automatically positioned to receive the locking screw 56. After spring 54 has been secured by the screw 56, crank arm 44 is swung upwardly to substantially the full-line position of Fig. 4, and plug 82 is screwed into cylinder 28 so that shock absorber 80 limits return movement of the piston 60 and holds the spring normally tensioned or preloaded.

Reference is now had to Figs. 7–12, which show the wheel-suspension system adapted for the rear wheels of the vehicle. As suggested, this form of the invention is identical or similar to the form hereinabove described, except for certain features which accommodate the rear-wheel mountings and the usual drive mechanisms for these wheels. In operation the rear-wheel-suspension systems function in the same manner as the front-wheel-suspension systems.

Figure 10:
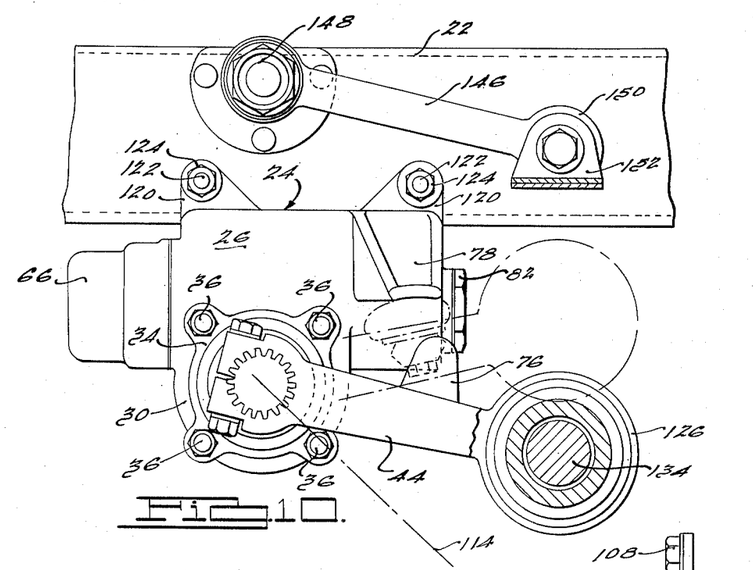
Fig. 10 is a transverse, vertical sectional view taken on the line 10—10 of Fig. 7.
Figures 11, 12:
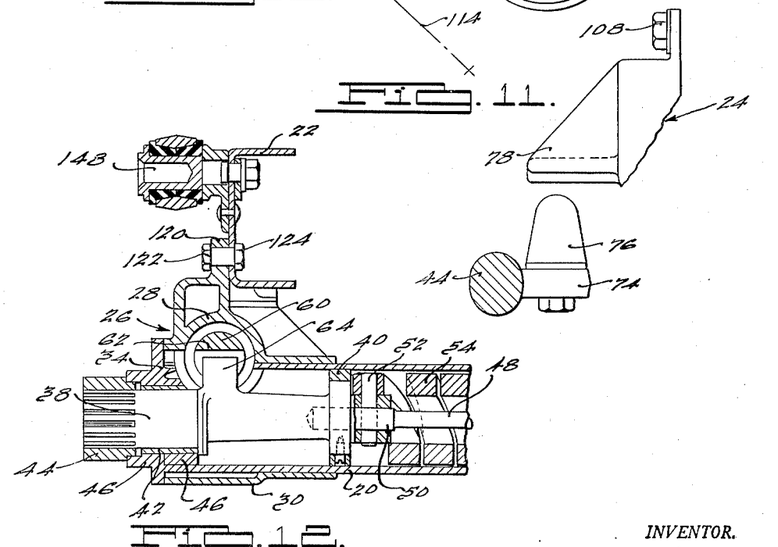
Fig. 11 is a fragmentary, transverse, vertical sectional view taken on the line 11—11 of Fig. 9.
Fig. 12 is a longitudinal sectional view taken on the line 12—12 of Fig. 9.

As shown in Figs. 10 and 12, casting 24 is provided with a pair of longitudinally spaced, upstanding lugs 120 which are attached to the main frame side rail 22 by bolts 122. As shown in Fig. 12, bolts 122 extend through lugs 120 and side rail 22 and the projecting ends thereof carry nuts 124 which hold the parts solidly together.

Figure 7:
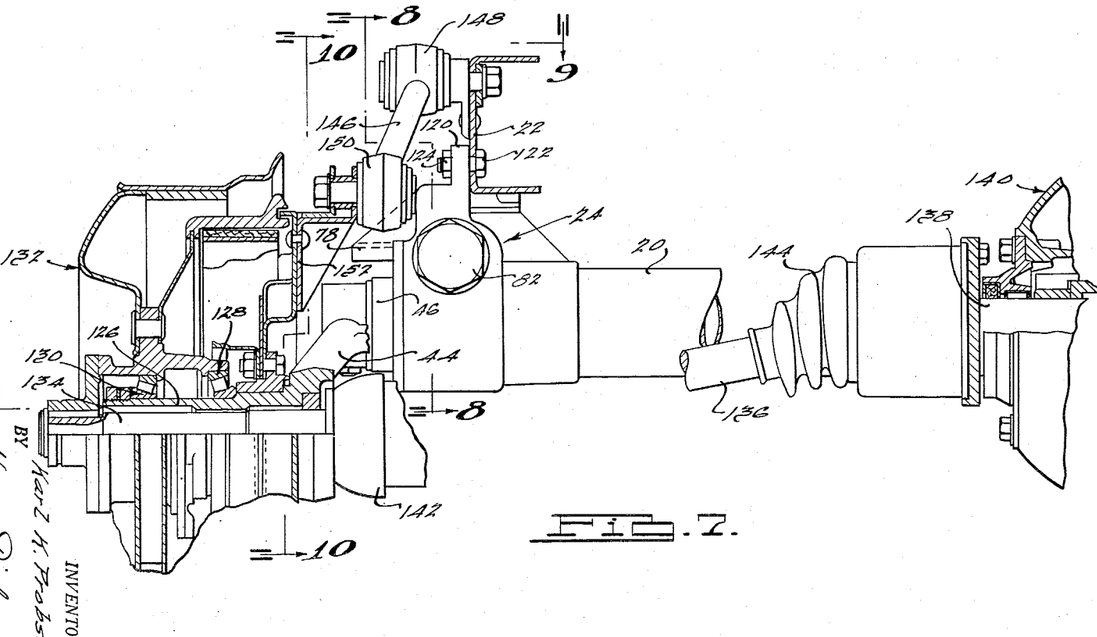
Fig. 7 is a longitudinal sectional view similar to Fig. 1, but showing the vehicle suspension system adapted for the rear wheels of the vehicle.
Figure 8:
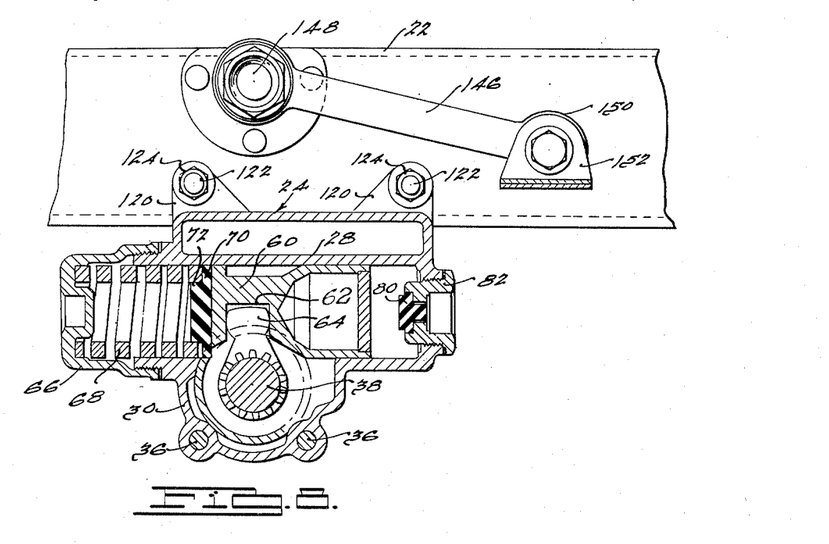
Fig. 8 is a transverse, vertical sectional view taken on the line 8—8 of Fig. 7.
Figure 9:
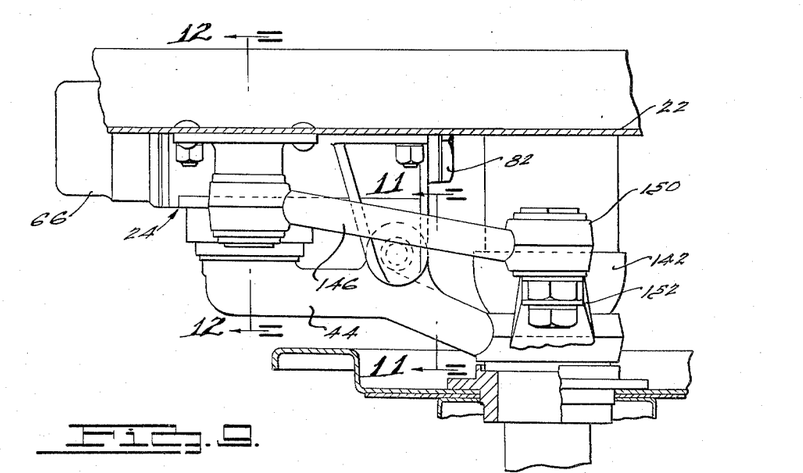
Fig. 9 is a transverse, horizontal sectional view taken on the line 9—9 of Fig. 7.

At its outer end the crank arm 44 is formed with an integral, horizontally and outwardly extending tubular spindle 126. Mounted on the spindle 126 and supported by roller bearings 128 and 130 is the usual rear-wheel assembly which is designated generally by the numeral 132. Journaled within the spindle 126 and having a driving connection with the wheel assembly 132 is an outer drive shaft 134. This shaft is driven through the medium of a connecting shaft 136 by an inner drive shaft 138 which is mounted in the differential 140. As best shown in Fig. 7, connecting shaft 136 is attached to the outer drive shaft 134 by a universal joint 142 and to the inner drive shaft 138 by universal joint 144.

In this form of the invention the articulated links 100 and 102 are replaced by a single link 146 which extends generally horizontally between a stationary pivotal connection 148 on the main frame side rail 22 and the pivotal connection 150 on the backing plate 152 of the wheel assembly 132.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a vehicle suspension system comprising a transversely arranged tubular axle; a crank for supporting a road wheel; a crankshaft anchored to said crank and journaled in said axle for rocking movement about its axis; a torsion spring disposed in the axle having one end connected to said axle and the other to said crankshaft, said spring so constructed and arranged as to afford the principal support for the vehicle load and the sole support therefor under predetermined minimum load conditions; a cylinder mounted transversely on the axle; a lever integrally formed on the crankshaft and extending radially into said cylinder; a piston in the cylinder having portions engaging said lever whereby movement of said lever serves to move said piston; a compression spring in the cylinder at one end thereof engaging said piston and adapted to supplement the action of the torsion spring under predetermined load conditions greater than said minimum load conditions; a stationary stop means projecting from the exterior of said cylinder; and a rubber bumper carried by the crank and engageable with said stop means under predetermined maximum load conditions whereby to supplement the action of said torsion and compression springs.

2. In a vehicle suspension system comprising a tubular, transversely extending axle; a crank for supporting a road wheel; a rotatable crankshaft anchored to said crank and journalled in the axle, a torsion spring surrounding said crankshaft and having one end anchored to said crankshaft and the other anchored to said axle to resist rotative movement thereof in one direction, said torsion spring adapted to afford the principal support for the vehicle load and the sole support therefor under predetermined minimum load conditions; a stationary cylinder mounted on said axle and having its axis arranged transverse to the axis of said crankshaft; a lever integrally formed on the crankshaft extending radially into the cylinder; a piston in the cylinder having portions engaging said lever, whereby the piston is moved back and forth in accordance with the load conditions of the vehicle; a pair of resilient elements in the cylinder one at each end thereof, one of said resilient means so constructed and arranged as to resist movement of the piston in one direction and to supplement the action of said torsion spring under predetermined greater-than-minimum load conditions, the other of said resilient means so constructed and arranged as to limit rebound movement of the piston when the load or road shock is relieved; stationary stop means rigidly mounted with respect to said cylinder; and a rubber bumper carried by the crank and engageable with said stop means under predetermined maximum load conditions.

3. In a vehicle suspension system, an open ended, tubular axle; a stationary cylinder mounted on said axle, said cylinder having an opening which opens into the interior of the axle; a crankshaft journaled in the axle; a torsion spring in the axle and coaxially arranged with respect to said crankshaft; means attaching one end of the spring to said crankshaft; holding means rigidly attached to the axle and engaging the other end of the spring but operable exteriorly of the axle to disengage or release the spring; a radially extending lever fixed to the crankshaft, said lever projecting through the opening into said cylinder and adapted to rock back and forth with the crankshaft; a piston in the cylinder, said piston provided with a transverse slot which accommodates the projecting portion of the lever; spring means in the cylinder positioned to resist movement of the piston in one direction and under predetermined load conditions; a crank fixed to the crankshaft; and a wheel mounting carried by said crank.

4. In a vehicle suspension system, an open ended, tubular axle; a stationary cylinder mounted on the axle with the axis of said cylinder generally at right angles to the axis of said axle, said cylinder having an opening which opens into the interior of the axle; a crankshaft journaled in the axle, said crankshaft adapted to rock back and forth about its axis in accordance with load conditions of the vehicle; a torsion spring in the axle coaxially arranged with respect to said crankshaft; means attaching one end of the spring to said crankshaft; holding means attached to the axle and engageable with the other end of the spring but operable exteriorly of the axle to disengage or release the spring; a radially extending lever fixed to the crankshaft, said lever projecting through the opening into said cylinder and adapted to rock back and forth with the crankshaft; a piston in the cylinder, said piston provided with a transverse slot which accommodates the projecting portion of the lever; a compression spring in the cylinder at one end of the piston and arranged to supplement the torsion spring under predetermined load conditions; stop means in the cylinder at the opposite end of the piston; a crank fixed to the crankshaft; and a wheel mounting carried by said crank.

5. In a vehicle suspension system, a tubular axle; a cylinder attached to said axle and having its axis arranged generally at right angles to the axis of said cylinder, said cylinder provided with an opening in the wall thereof and a transverse passage which extends from the opening through the side of the cylinder; a crankshaft rotatably mounted in the axle and adapted to rock back and forth about its axis; a torsion spring secured to the crankshaft adapted to resist rocking movement thereof in one direction and adapted to afford the principal support for the vehicle; means attached to said axle releasably holding one end of the spring; a radially extending lever fixed to the crankshaft and projecting into the cylinder through said opening; a piston in the cylinder, said piston provided with a transverse slot which accommodates the projecting portion of the lever and registers with the passage in said cylinder in one position of the piston; spring means in the cylinder at one end of the piston adapted to supplement the action of the torsion spring under predetermined load conditions; and a removable closure for said passage.

6. In a vehicle suspension system, a tubular axle; a cylinder attached to and mounted on said axle, said cylinder provided with an opening and a transverse passage which extends from the opening through the side of the cylinder; a crankshaft coaxially arranged with respect to and rotatably mounted in said axle and adapted to rock back and forth about its axis, a torsion spring secured to the crankshaft adapted to resist rocking movement thereof in one direction and adapted to afford the principal support for the vehicle; means attached to said axle and releasably holding one end of the spring; a radially extending lever fixed to the crankshaft and projecting into the cylinder through said opening; a piston in the cylinder, said piston provided with a transverse slot which accommodates the projecting portion of said lever and registers with the passage in said cylinder in one position of the piston; resilient means in the cylinder at opposite ends of the piston, one of said resilient means so constructed and arranged as to yieldingly resist movement of the piston in one direction and to supplement the action of the torsion spring under predetermined load conditions, the other of said resilient means so constructed and arranged as to normally prevent registration of the slot with said passage but adjustable to permit such registration.

7. In a vehicle suspension system, an open ended, tubular axle; a cylinder attached to said axle, said cylinder having an opening which opens into the interior of said axle and both the cylinder and axle having registering passages which extend from the opening through the side of the cylinder and the end of the axle respectively; a crankshaft mounted for rocking movement in the axle; a torsion spring in the axle adapted to afford the principal support for the vehicle load; means for attaching one end of the spring to the crankshaft and the other end thereof to the axle and at least one of said ends being releasable from exteriorly of the axle; a radially extending lever fixed to the crankshaft and projecting into the cylinder through said opening; a piston in the cylinder, said piston provided with a transverse slot which accommodates the projecting portion of the lever and registers with said passages when the crankshaft is positioned to remove the load from said torsion spring; spring means in the cylinder at one end of the piston adapted to supplement the action of said torsion spring under predetermined load conditions; and a removable closure for the end of the axle and said passages.

8. In a vehicle suspension system, an open ended, tubular axle; a cylinder attached to said axle and arranged generally at right angles to the axis of said axle, said cylinder having an opening which opens into the interior of said axle and both the cylinder and axle having registering passages which extend from the opening through the side of the cylinder and the end of the axle respectively; a crankshaft mounted for rocking movement in the axle; a torsion spring in the axle adapted to afford the principal support for the vehicle load; means for attaching one end of the spring to the crankshaft and the other end thereof to the axle and at least one of said ends being releasable from exteriorly of the axle; a radially extending lever fixed to the crankshaft and projecting into the cylinder through said opening; a piston in the cylinder, said piston provided with a transverse slot which accommodates the projecting portion of the lever and registers with said passages when the crankshaft is positioned to remove the load from said torsion spring; and resilient means in the cylinder at opposite ends of the piston, one of said resilient means coactive with the piston and adapted to supplement the action of the torsion spring under predetermined load conditions, the other of said resilient means positioned to limit rebound movement of the piston and to normally prevent registration of the slot with said passages but adjustable to permit such registration.

9. In a vehicle suspension system, a tubular axle; a cylinder attached to said axle and arranged with its axis generally at right angles to the axis of said axle, said cylinder having an opening in one side wall thereof which opens into the axle, both said cylinder and axle being provided with registering passages which extend from the opening and through the side of the cylinder and the end of the axle respectively; a crankshaft journaled in the axle for rocking movement about its axis and within predetermined limits; a torsion spring in the axle having one end operatively connected to the crankshaft and the other end fixed to the axle and adapted to afford the principal support for the vehicle load, said spring being relieved of substantially all tension when the crankshaft is in preload position at one limit of its travel and progressively tensioned as the latter moves to the other limit of its travel; a radially extending lever fixed to the crankshaft and projecting into the cylinder through said opening, said lever adapted to rock back and forth in the cylinder as the crankshaft turns about its axis; a piston operable in the cylinder by said lever, said piston provided with a transverse slot which confines the projecting end of the lever and registers with said passages only when the crankshaft is in preload position; and adjustable stop means carried by the cylinder normally positioned to limit movement of the piston and prevent registration of the slot with said passages.

10. In a vehicle suspension system, a tubular axle; a cylinder attached to said axle and arranged with its axis generally perpendicular to the axis of said axle, said cylinder having an opening which opens into the axle and both provided with registering passages which extend from the opening and through the side of the cylinder and the end of the axle respectively; a crankshaft journaled in the axle for rocking movement about its axis and within predetermined limits; a torsion spring in the axle having one end operatively connected to the crankshaft and the other end fixed to the axle, and adapted to afford the principal support for the vehicle load, said spring being relieved of substantially all tension when the crankshaft is at one limit of its travel and progressively tensioned as the latter moves to the other limit of its travel; a radially extending lever fixed to the crankshaft and projecting into the cylinder through said opening, said lever adapted to rock back and forth in the cylinder as the crankshaft turns about its axis; a piston operable in the cylinder by said lever, said piston provided with a transverse slot which confines the projecting end of the lever and registers with said passages only when the crankshaft is at one limit of its travel; and resilient means at the ends of the cylinder for limiting movement of the piston, one of said resilient means supplementing the action of the torsion spring under predetermined load conditions, the other of said resilient means limiting rebound movement of the piston and normally positioned to prevent movement of the crankshaft to the said one limit of its travel but adjustable to permit registration of the slot with said passages.

11. In a vehicle suspension system, an open ended, tubular axle; a cylinder mounted on the axle with its axis arranged generally at right angles to the axis of said axle, said cylinder provided with an opening which opens into the axle and both having registering lateral passages which extend from the opening through the side of the cylinder and the end of the axle respectively; a crankshaft journaled in the axle for rocking movement about its axis; a torsion spring in the axle and attached at one end to said crankshaft; means carried by the axle serving to operatively connect the other end of the torsion spring with the crankshaft whereby the spring will be tensioned by movement of the crankshaft from its initial position; a radially extending lever fixed to the crankshaft and projecting into the cylinder through said opening; a piston operable in the cylinder by said lever, said piston provided with a transverse slot which confines the projecting end of the lever and registers with said passages when the crankshaft is in the said initial position; means including a rebound bumper mounted interiorly of said cylinder at one end thereof and engageable with the piston to prevent return of the crankshaft to said initial position when the same is rocked from said position to tension the torsion spring; and a compression spring in the cylinder engageable with the other end of said piston under predetermined load conditions of the vehicle to yieldably resist rotative movement of the crankshaft in a direction to tighten said torsion spring.

12. In a vehicle suspension system, an open ended, tubular axle; a cylinder mounted on said axle with its axis disposed generally at right angles to the axis of said axle, said cylinder provided with an opening which opens into the axle and both said axle and said cylinder having registering lateral passages which extend from the opening through the side of the cylinder and the end of the axle respectively; a crankshaft journaled in the axle for rocking movement about its axis; a torsion spring in the axle and attached at one end to said crankshaft; means carried by the axle serving to operatively connect the other end of the torsion spring with the crankshaft whereby the spring will be tensioned by movement of the crankshaft from its initial position; a radially extending lever fixed to the crankshaft and projecting into the cylinder through said opening; a piston operable in the cylinder by said lever, said piston provided with a transverse slot which confines the projecting end of the lever and registers with said passages when the crankshaft is in the initial position; means including a rebound bumper mounted at one end of the cylinder and adapted to engage with the piston to prevent return of the crankshaft to the initial position when the same is rocked from said position to tension the torsion spring; a compression spring in the cylinder adapted to engage with the other end of said piston under predetermined load conditions of the vehicle to yieldably resist rotative movement of the crankshaft in a direction to tighten said torsion spring; and a removable end plate normally closing the open end of the axle, said plate provided with a central bearing which receives and rockably supports one end of the crankshaft.

13. In a vehicle suspension system, an open ended, tubular axle; a cylinder mounted on said axle with its axis arranged generally at right angles to the axis of said axle, said cylinder provided with an opening which opens into the axle and both said axle and said cylinder having registering lateral passages which extend from the opening through the side of the cylinder and the end of the axle respectively; a crankshaft journaled in the axle for rocking movement about its axis; a torsion spring in the axle and attached at one end to said crankshaft; means carried by the axle serving to operatively connect the other end of the torsion spring with the crankshaft whereby the spring will be tensioned by movement of the crankshaft from its initial position; a radially extending lever fixed to the crankshaft and projecting into the cylinder through said opening; a piston operable in the cylinder by said lever, said piston provided with a transverse slot which confines the projecting end of the lever and registers with said passages when the crankshaft is in the initial position; means including a rebound bumper mounted at one end of the cylinder and adapted to engage with the piston to prevent return of the crankshaft to the initial position when the same is rocked from said position to tension the torsion spring; a compression spring in the cylinder adapted to engage the other end of said piston under predetermined load conditions of the vehicle to yieldably resist rotative movement of the crankshaft in a direction to tighten said torsion spring; a removable end plate normally closing the open end of the axle of said passages, said plate provided with a central bearing which receives and rockably supports one end of the crankshaft; a crank on the crankshaft and a wheel mounting carried by said crank.

KARL K. PROBST.

REFERENCES CITED

The following references are of record in the file of this patent:

UNITED STATES PATENTS

| Number | Name | Date |
|---|---|---|
| 2,023,254 | Stimson | Dec. 3, 1935 |
| 2,023,650 | Sneed | Dec. 10, 1935 |
| 2,063,747 | Olley | Dec. 8, 1936 |
| 2,139,592 | Kirby | Dec. 6, 1938 |
| 2,169,335 | Best | Aug. 15, 1939 |
| 2,226,047 | Borgward | Dec. 24, 1940 |
| 2,241,826 | Rabe | May 13, 1941 |
| 2,256,069 | Wagner | Sept. 16, 1941 |

FOREIGN PATENTS

| Number | Country | Date |
|---|---|---|
| 469,306 | Great Britain | July 22, 1937 |
| 488,172 | Great Britain | July 1, 1938 |